(12) United States Patent
Nakamura et al.

(10) Patent No.: US 9,247,475 B2
(45) Date of Patent: Jan. 26, 2016

(54) RADIO CONTROL APPARATUS, CONNECTION DESTINATION SWITCHING METHOD, AND SYSTEM

(71) Applicant: NTT DOCOMO, INC., Tokyo (JP)

(72) Inventors: Yuichiro Nakamura, Tokyo (JP);
Kenichiro Aoyagi, Tokyo (JP);
Hideyuki Matsutani, Tokyo (JP);
Kouichi Morikawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 45 days.

(21) Appl. No.: 14/352,075

(22) PCT Filed: Nov. 12, 2012

(86) PCT No.: PCT/JP2012/079289
§ 371 (c)(1),
(2) Date: Apr. 16, 2014

(87) PCT Pub. No.: WO2013/084670
PCT Pub. Date: Jun. 13, 2013

(65) Prior Publication Data
US 2014/0242996 A1      Aug. 28, 2014

(30) Foreign Application Priority Data

Dec. 7, 2011   (JP) ................................. 2011-268035

(51) Int. Cl.
| *H04W 36/12* | (2009.01) |
| *H04W 4/22* | (2009.01) |
| *H04W 36/38* | (2009.01) |
| *H04W 48/02* | (2009.01) |
| *H04W 76/06* | (2009.01) |
| *H04W 36/14* | (2009.01) |
| *H04W 48/12* | (2009.01) |

(52) U.S. Cl.
CPC .............. *H04W 36/38* (2013.01); *H04W 48/02* (2013.01); *H04W 76/064* (2013.01); *H04W 36/14* (2013.01); *H04W 48/12* (2013.01)

(58) Field of Classification Search
CPC .............................. H04W 36/12; H04W 4/22
See application file for complete search history.

(56) References Cited

PUBLICATIONS

International Search Report for corresponding International Application No. PCT/JP2012/079289, mailed Dec. 11, 2012 (3 pages).
Written Opinion for corresponding International Application No. PCT/JP2012/079289, mailed Dec. 11, 2012 (3 pages).
3GPP TS 25.331 V9.17.0; "3rd Generation Partnership Project; Technical Specification Group Radio Access Network; Radio Resource Control (RRC); Protocol specification (Release 9);" Dec. 2013 (1810 pages).
3GPP TS 36.331 V9.17.0; "3rd Generation Partnership Project; Technical Specification Group Radio Access Network; Evolved Universal Terrestrial Radio Access (E-UTRA); Radio Resource Control (RRC); Protocol specification (Release 9);" Dec. 2013 (262 pages).

*Primary Examiner* — Christopher M Brandt
(74) *Attorney, Agent, or Firm* — Osha Liang LLP

(57) ABSTRACT

A radio control apparatus determines a call type of a communication terminal, and transmits a release redirection control signal to the communication terminal. When the call type is a general call, the release redirection signal not including broadcast information is transmitted to the communication terminal. When the call type is an important communication call, the release redirection control signal including the broadcast information is transmitted to the communication terminal.

8 Claims, 4 Drawing Sheets

RADIO CONTROL APPARATUS, CONNECTION DESTINATION SWITCHING METHOD, AND SYSTEM

TECHNICAL FIELD

The present invention is related to a radio control apparatus, a connection destination switching method, and a system.

BACKGROUND ART

In the Third Generation Partnership Projects (3GPP), a mobile communication system based on Code Division Multiple Access (CDMA) technology has been specified, which is referred to as a "Wideband-Code Division Multiple Access (W-CDMA) System." The mobile communication system (which is referred to as "3G," hereinafter) is widely adopted in many countries, which include Japan and European countries, for example. The W-CDMA system is also referred to as a "Universal Mobile Telecommunications System (UMTS)." For a system based on a Long Term Evolution (LTE) scheme, specifications have been defined so that a higher data rate, a greater capacity, and lower latency are achieved compared to those of the communication system based on the 3G scheme. For the LTE system, Orthogonal Frequency Division Multiplexing (OFDM) technology has been specified. Each of the various types of the radio communication systems is referred to as "Radio Access Technology (RAT)." In addition to the radio communication systems based on the W-CDMA scheme and the LTE scheme, the RATs include radio communication systems based on the CDMA2000 standard and the GERAN standard, for example. These RATs are operated, by various operators, in various countries and regions, with various frequencies. For some cases, a plurality of RATs may be operated in a same area. In such a case, for attempting to distribute load on some RATs, or for a case in which a user requests a service which is only provided in a specific RAT, for example, a process is executed which causes a user to transfer from one specific RAT to another RAT.

For example, supposed that a voice communication service is not provided in a particular RAT, which is based on the LTE scheme, and that a user connected to the RAT requests the voice communication service. In this case, it may be necessary to transfer the user to a RAT, which is based on the 3G scheme, and provide the voice communication service to the user. Such a technique is referred to as "CS Fallback (CSFB)."

One method of switching a connection destination among a plurality of different RATs is a method which is called redirection (Release with Redirection). When it becomes necessary to transfer a user (mobile station) in a RAT to another RAT, a network (NW) transmits a release redirection control signal to a mobile station. The release redirection control signal includes information indicating a destination RAT and a frequency which is used in the destination RAT. The release redirection control signal is a RRC message (RRC Connection Release), which is for reporting that the connection with a current RAT is to be terminated and a connection with a switching destination RAT is to be established. The mobile station that receives the release redirection control signal (RRC Connection Release) terminates the connection with the current RAT; searches for a cell, whose frequency is specified as the switching destination; obtains a synchronization signal; retrieves broadcast information from the switching destination cell; and establishes connection with the switching destination cell. In this manner, the mobile station is served in the switching destination cell. For example, the mobile station can receive a service, which is provided in the switching destination RAT.

A technique is known such that a part of broadcast information (Master information Block: MIB) and a System Information Block (SIB), which are transmitted in the switching destination RAT, is included in the release redirection control signal (RRC Connection Release) so as to reduce a switching time period during the redirection of the mobile station between the RATs. Some specifications of the 3GPP specify this technique, and it is called "Release with redirection with SIB" (cf. Non-Patent Document 1 and Non-Patent Document 2 for this point). Since the mobile station which receives the release redirection control signal can reduce the time period required for retrieving the broadcast information, the switching of the RAT can be executed, while reducing at least the corresponding amount of time. The quick switching of the RATs is desirable in a point that, for example in the CSFB, the voice communication service can be quickly provided by quickly switching the RAT from the LTE scheme to the 3G scheme, after receiving a request for the voice communication from the user. When the RAT is switched by this method, a connection request signal (RRC Connection Request) to be transmitted by the mobile station to a base station of the switching destination RAT includes a predetermined indicator (System Information Container Stored Indicator), which indicates that the mobile station is operating in accordance with the "Release with Redirection with SIB."

RELATED ART DOCUMENT

Non-Patent Document

[Non-Patent Document 1] 3GPP TS25.331
[Non-Patent Document 2] 3GPP TS36.331

SUMMARY OF THE INVENTION

Problem to be Solved by the Invention

The broadcast information which is transmitted in the RAT is suitably updated. Thus, it may be required for a mobile station to retrieve latest broadcast information. Accordingly, for a case in which the switching of the RAT by the "Release with Redirection with SIB" is executed, it is desirable that the broadcast information to be transmitted with the release redirection control signal is the same as the latest broadcast information of the switching destination RAT. However, since the switching source RAT and the switching destination RAT are utilizing correspondingly different types of radio access technology, it is not easy to cause the broadcast information to be transmitted with the release redirection control signal to completely coincide with or to be updated with the latest broadcast information of the switching destination RAT, in real time. Consequently, a case may arise in which the broadcast information to be transmitted to the mobile station prior to switching the RAT does not coincide with the latest broadcast information in the switching destination. For example, suppose that access barring of a radio section is started due to congestion or convenience of an operator. Suppose also that the broadcast information transmitted to the mobile station prior to switching of the RAT is the broadcast information prior to the update, and it indicates that the barring is not performed, but the broadcast information which is transmitted in the switching destination RAT is the updated broadcast information, and it indicates that barring is performed. In this case, the mobile station which receives the latest broadcast information can find that barring is performed, and the mobile station may refrain from accessing the RAT. However, the mobile station which receives the release redirection control signal including the broadcast information prior to the update does not find that barring is actually performed, and the mobile station may attempt to establish a connection. Consequently, it is possible that the congestion in the switching destination RAT becomes severe, and the communication quality with respect to another mobile station is lowered. Furthermore, it is possible that the mobile station performs unnecessary communication processing, for example.

An object of the present invention is to reduce, at least, an adverse effect on communication quality and a service in a second radio communication system, when a radio control apparatus in a first radio communication system transmits a release redirection control signal together with broadcast information of the second radio communication system to a communication terminal, the release redirection control signal which commands the communication terminal to switch a connection destination to the second communication system, and when the broadcast information which is transmitted together with the release redirection control information does not coincide with the latest broadcast information in the second radio communication system.

Means for Solving the Problem

A radio control apparatus according to an embodiment is a radio control apparatus that controls radio communication of a communication terminal in a first radio communication system. The radio control apparatus includes a determination unit that determines a call type of a communication of a communication terminal, when a connection destination of the communication terminal is switched to a second radio communication system; a storing unit that repeatedly receives and stores broadcast information transmitted in the second radio communication system; and a communication unit that transmits a release redirection control signal to the communication terminal, wherein the release redirection control signal indicates that a connection with the first radio communication system is to be disconnected, and that a connection with the second radio communication system is to be established. When the determination unit determines that the call type is a general call, the communication unit transmits the release redirection control signal not including the broadcast information to the communication terminal. When the determination unit determines that the call type is an important communication call, the communication unit transmits the release redirection control signal including the broadcast information to the communication terminal.

Effect of the Present Invention

According to the embodiment, when a connection destination of a communication terminal connected with a first radio communication system is switched to the second radio communication system, an adverse effect on communication quality and a service in a second radio communication system can at least be reduced.

EMBODIMENTS FOR CARRYING OUT THE INVENTION

Figure 1:
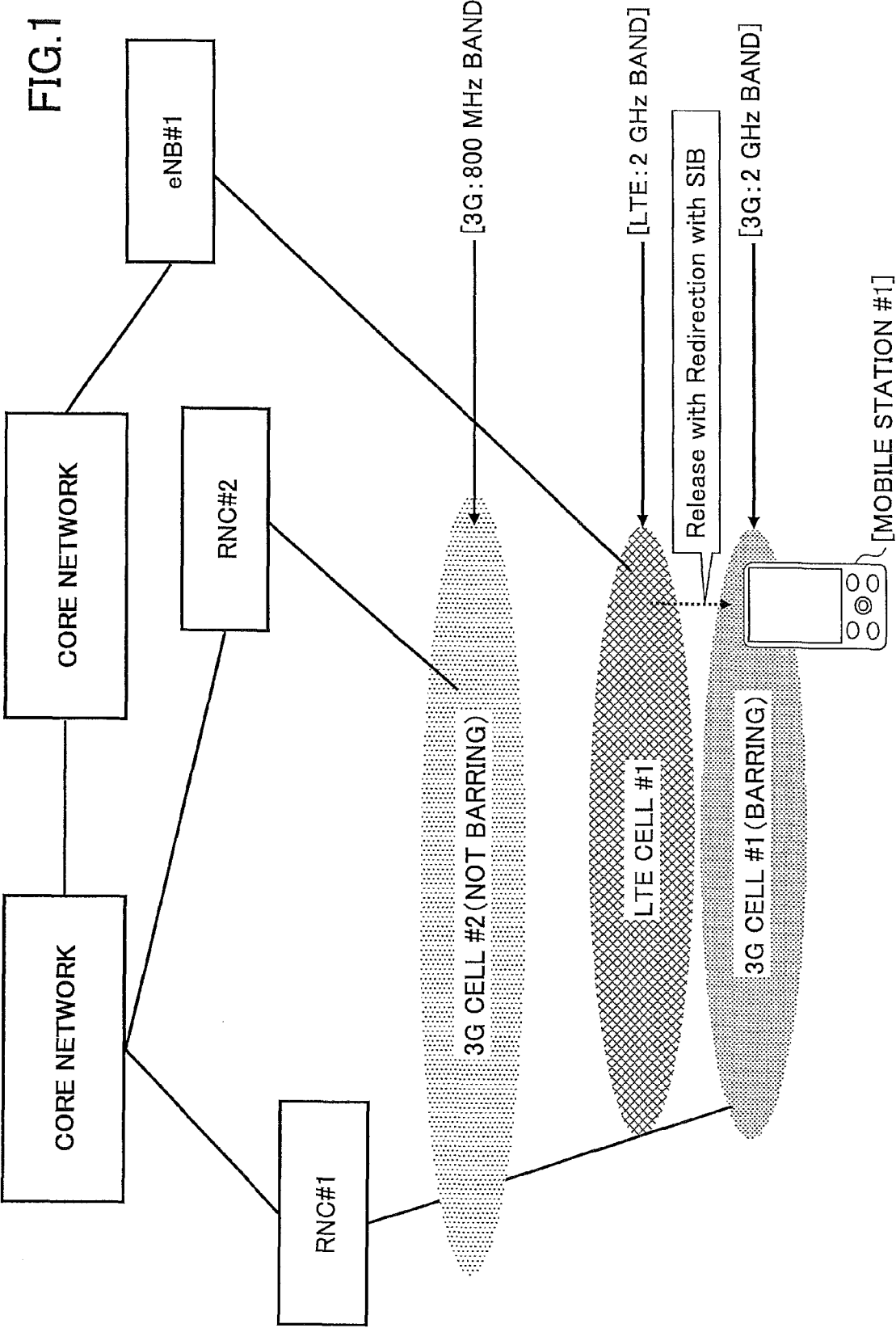
FIG. 1 is a diagram showing a system in which different RATs coexist.

In an embodiment of the present invention, a redirection method is changed depending on whether a communication is an "important communication call." When the communication is not the "important communication call" (when it is a "general call"), a release redirection control signal not including broadcast information is transmitted to a mobile station, and redirection is executed (Release with Redirection). When the communication is the "important communication call," the release redirection control signal including the broadcast information is transmitted to the mobile station, and the redirection is executed (Release with Redirection with SIB). When the communication is the "general call," which is not the "important communication call," and when access barring is performed for a switching destination RAT, the mobile station originating the "general call" becomes a target of barring. A mobile station originating the "important communication call" may or may not become a target of barring, depending on a barring state of the switching destination. When the barring state is barring based on an access percentage (access %), the mobile station originating the "important communication call" may not become the target of barring, and connection is allowed. When the barring state is barring other than the barring based on the access percentage, the mobile station originating the "important communication call" becomes the target of barring, in principle. However, when the "important communication call" is a "maintenance call" in the barring during construction, the connection is allowed.

Hereinafter, an embodiment is explained while referring to the accompanying drawings. In the drawings, the same reference numeral or the same reference symbol is attached to similar elements. The embodiment is explained from the following perspectives.

1. Overview
2. System
3. Barring and call type
4. Operation example
5. Base station (eNB)
6. Radio Network Controller (RNC)

<1. Overview>

As described above, in a related technique, broadcast information which is transmitted together with a release redirection control signal is not necessarily the same as the latest broadcast information in a switching destination RAT. If these are different, the broadcast information indicating that barring is not performed may be transmitted to a mobile station, though barring is performed in the switching destination RAT, for example. The mobile station may attempt to start communication in the switching destination RAT as usual, and it is possible that communication quality and a service in the switching target RAT are adversely affected. It can be considered to allow access to a RAT only for a high priority call, such as an "important communication call," which is described later. However, in this case, even if barring, such as barring during construction, is performed in a cell, an establishment of a connection is attempted for the "important communication call." However, for the case of barring during construction, it is difficult for a network to provide a service with sufficient quality regardless of a call type. Thus, it is better to avoid accessing such a cell. Further, suppose that the broadcast information is transmitted to the mobile station, the broadcast information which indicates that barring is performed in the switching destination RAT, but barring is removed in the current switching destination RAT. In this case, although the switching destination RAT is actually accessible, a determination may be made that barring is performed, and the switching destination RAT may not provide services sufficiently.

In an embodiment of the present invention, which is explained below, a determination is made as to whether a call type of a mobile station is a "general call" or an "important communication call." Broadcast information of the switching destination RAT is included in a release redirection control signal, only for a case in which the call type is the "important communication call." Furthermore, it is forced that the broadcast information indicates that barring is not performed, regardless of whether barring is performed in the switching destination RAT. In this case, when a mobile station originating the "general call" attempts to perform redirection, since the release redirection control signal does not include the broadcast information, the mobile station retrieves the latest broadcast information directly from the switching destination RAT. Slight latency occurs compared to a case of "Release with Redirection with SIB." However, a problem that the quality is lowered in the switching target cell can be effectively avoided. When a mobile station originating the "important communication call" attempts to perform redirection, since the release redirection control signal includes the broadcast information, the switching destination RAT can be quickly accessed. In this case, a connection to the switching destination RAT is more easily established for the "important communication call," which is more important than the "general call." Further, information indicating that the mobile station, which originates the "important communication call," is to switch the RAT is transmitted to a core network of the switching destination, and a connection is preferentially established also in the core network. In this manner, it is considered to reduce the effect on the communication service as much as possible. However, when access prohibition regulation or barring during construction (which is described later) is performed in the switching destination RAT, access is denied even if it is the "important communication call," and an adverse effect on the communication service is prevented from occurring.

In this manner, in the embodiment of the present invention, redirection based on "Release with Redirection with SIB" is performed with the broadcast information indicating that barring is not performed, only if a call type is the "important communication call." With this, it can be avoided that the mobile station originating the "important communication call" becomes the target of barring in the switching destination RAT, and the effect on the communication service can be avoided. Further, by transmitting the information to a core network of the switching target, a preferential connection can also be established in the core network for the "important communication call," and the effect on the communication service can be avoided. Furthermore, even if the call is the "important communication call," for specific barring among a plurality of types of barring, connection is disallowed (not allowed), and thereby an adverse effect on the communication, which may be caused by forcibly establishing a connection, can be prevented in advance.

<2. System>

FIG. 1 shows a system which is used in the embodiment of the present invention. The system includes a plurality of radio communication systems (RATs). At least in a portion of an area, communications can be performed by two or more RATs. For the case of the depicted example, the system includes an LTE-based radio communication system (first RAT) as a first radio communication system, and a 3G-based radio communication system (second RAT) as a second radio communication system.

The LTE-based radio communication system (the first RAT) includes a base station (eNB #1) which is connected to a core network; a cell (LTE cell #1) which is covered by the base station (eNB #1), and a mobile station (user equipment: UE) which is served in the cell. The first RAT utilizes a frequency band of 2 GHz, for example. For the case of the depicted example, only one base station is shown. However, the number of the base stations and the number of the cells can be any suitable numbers.

The 3G-based radio communication system (the second RAT) includes first and second radio network controllers (RNC #1 and RNC #2) which are connected to a core network; one or more base stations (not shown) which are connected to the first and second radio network controllers, respectively; cells (3G cell #1 and 3G cell #2) which are covered by the corresponding base stations; and mobile stations which are served in the cells. The radio network controller may be referred to as a "base station controller." The second RAT utilizes a frequency band of 800 MHz, for example. The second RAT may be a W-CDMA based communication system, a GSM/GERAN based communication system, a CDMA 2000 based communication system, or the like. For the case of the depicted example, only two radio network controllers (RNCs) and two cells are shown. However, the numbers of the RNCs and the numbers of the cells may be any suitable numbers.

The base station (eNB #1) in the first RAT functions as a first radio control apparatus, and it controls radio communication by a communication terminal in the first RAT, which is based on the LTE scheme. The radio network controllers (the RNC #1 and the RNC #2) in the second RAT function as second radio control apparatuses, and they control radio communications by communication terminals in the second RAT, which is based on the 3G scheme. The core network of the first RAT and the core network of the second RAT are separately shown. However, they may be mutually connected. When the first and second radio control apparatuses (eNB #1, RNC #1, and RNC #2) command mobile stations to switch the connection destination RAT by the redirection, the first and second radio control apparatuses follow a procedure of the "Release with Redirection with SIB."

For convenience of the explanation, it is assumed that, first, a mobile station #1 is served in the LTE cell #1 of the first RAT, and subsequently the mobile station #1 transfers to the 3G cell #1 of the second RAT. Here, the direction of the transfer between the RATs may be the opposite direction. Further, it is assumed that the 3G cell #1, which is the switching destination, is currently barred. In contrast, it is assumed that, in the 3G cell #2, such barring is not performed. The mobile station #1 may perform communications both in the first RAT (LTE) and the second RAT (3G), and the mobile station #1 is any communication terminal that can perform redirection by the "Release with Redirection with SIB." In general, such a communication terminal is a mobile station. However, it may be a fixed station. For example, the communication terminal may be user equipment, a mobile telephone, an information terminal, a high-performance mobile telephone, a smart phone, a tablet computer, a personal digital assistant, a mobile personal computer, a palmtop computer, a laptop computer, a desktop computer, or the like. However, the communication terminal is not limited to these.

<3. Barring and Call Type>

Each of the first and second radio communication systems performs access barring of a radio section depending on a condition such as load distribution, congestion, or operator's convenience, for example. There are three types of barring, which are (1) access percentage barring, (2) access prohibition regulation, and (3) barring during construction.

(1) For the case of the access percentage barring, access is barred depending on an access class, which is written in an IC card (typically a SIM card) stored in the mobile station. Basically, the access percentage barring is performed, in order to distribute load of call processing. Types of access classes include a general class and a special class. Call types of a special class mobile station are a "priority call" and an "emergency call," and which are preferentially processed compared to communication (a general call) of a general class mobile station. When the access percentage barring is performed in a cell, congestion of the cell is addressed by prohibiting or denying communication of the general class mobile station, while allowing communication of the special class mobile station. Namely, when a connection request signal is received from a mobile station which is served in the cell in which the access percentage barring is performed, a network confirms an access class of the mobile station. When the access class of the mobile station is the special class, the access is allowed. However, when the access class of the mobile station is not the special class (when it is the general class), the access is prohibited or denied.

Partial barring can be achieved by periodically changing mobile stations which are actual targets of the barring, among the mobile stations corresponding to the general class. For example, when all of the mobile stations in the general class are the targets of the barring, a barring rate is 100%. When half of the mobile stations in the general class are the targets of the barring, a barring rate is 50%. For the latter case, by changing the half of the mobile stations which are the targets of the barring at every constant time period, all of the mobile stations in the general class can be evenly barred.

(2) For the case of the access prohibition regulation, for example, due to a malfunction of an apparatus at a side of the network (e.g., a base station or a mobile switching center), access from all of the mobile stations is prohibited or denied. In this case, access is uniformly barred irrespective of an access class of a mobile station (a general class or a special class) or a call type.

(3) For the case of the barring during construction, in principle, access from all the mobile stations is prohibited or denied. However, the barring during construction is barring which is performed by an operator for implementing testing, for example. Thus, a connection is established for a call for such testing (a maintenance call). Namely, when a connection request signal is received from a mobile station being served in a cell, in which the barring during construction is performed, the network determines whether the call type of the mobile station is the maintenance call. When the call type is the "maintenance call," access is allowed. When the call type is not the maintenance call, access is prohibited or denied.

Here, even if communication is from a mobile station which corresponds to the general class from a perspective of the access class, there are some calls which are to be urgently and preferentially connected, such as a return incoming call from a police agency, or an incoming call responding to a "priority call" or an "emergency call." In the present application, these are referred to as "special calls." In the present application, high priority communication calls having a higher priority degree than that of the "general call," such as the "priority call," the "emergency call," the "maintenance call," and the "special call," are collectively referred to as "important communication calls."

<4. Operation Example>

There is explained an operation example of the mobile station #1, and the radio control apparatuses (eNB #1, RNC #1, and RNC #2) in the system such as shown in FIG. 1. Initially, the mobile station #1 is served in the LTE cell #1 of the first RAT (eNB #1). The radio control apparatus (eNB #1) of the first RAT determines to transfer the mobile station #1 to the second RAT. Such a determination is made, for example, in a case in which a user of the mobile station #1 is requesting a service, which is not provided in the first RAT, but which is provided in the second RAT; in a case in which the first RAT is congested; or in a case in which the load to the first RAT is to be distributed. For example, when a voice communication service is not provided in the first RAT, and when the user requests the voice communication service, such a determination may be made.

Figure 2:
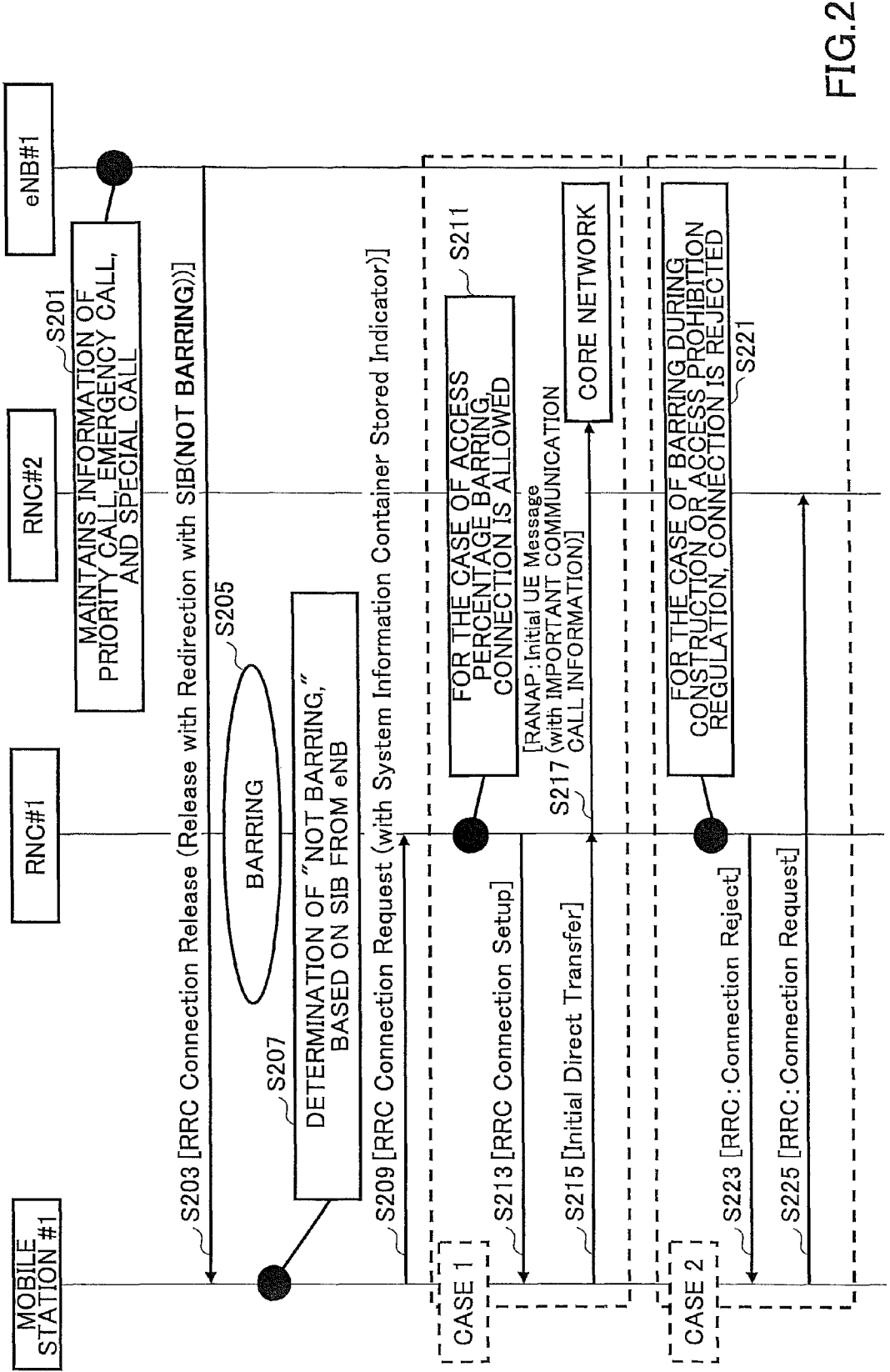
FIG. 2 is a diagram showing an operation example.

As shown in step S201 of FIG. 2, the radio control apparatus (eNB #1) of the first RAT maintains information on a call type of communication by a mobile station being served. As described above, the call type is the "general call" or the "important communication call." The "important communication calls" are the "priority call", the "emergency call," the "maintenance call," and the "special call." For convenience of the explanation, suppose that the call type of the communication of the mobile station #1 is the "important communication call." Additionally, suppose that the radio control apparatus (eNB #1) of the first RAT maintains broadcast information (SIB), which is transmitted in the second RAT.

At step S203, the radio control apparatus (eNB #1) of the first RAT transmits a release redirection control signal (RRC Connection Release) including the broadcast information (SIB), which is transmitted in the second RAT, to the mobile station #1, in accordance with the scheme of the "Release with Redirection with SIB." However, the broadcast information, which is transmitted to the mobile station #1, is modified so as to indicate that barring is not performed, regardless of whether barring is performed by the first RAT. For convenience of the explanation, it is assumed that barring is performed under the command of the first radio control apparatus (RNC #1) of the first RAT, and that barring is not performed under the command of the second radio control apparatus (RNC #2) of the first RAT. The release redirection control signal includes, at least, information indicating the switching destination RAT and a frequency of the RAT. The release redirection control signal commands the mobile station #1 to disconnect the connection with the first RAT, and to search for a cell of the switching destination RAT.

The mobile station #1 which receives the release redirection control signal (RRC Connection Release) searches for the cell (3G cell #1) with the specified frequency, and finds it. As shown in step S205, actually the barring is performed in the cell (3G cell #1). However, the broadcast information, which is retrieved by the mobile station #1 together with the release redirection control signal, is modified so as to indicate that the barring is not performed. Accordingly, the mobile station #1 determines that the barring is not performed in the cell (S207).

At step S209, the mobile station #1 transmits a connection request signal (RRC Connection Request) to the radio control apparatus (RNC #1) so as to attempt to establish a connection with the cell. The connection request signal includes an information element IE "System Information Container Stored Indicator," which indicates that the "Release with Redirection with SIB" is executed. In the radio control apparatus (RNC #1), a determination is made that the call type of the communication of the mobile station #1 is the "important communication call" by confirming the received information element IE "System Information Container Stored Indicator." In the embodiment of the present invention, when the call type is the "important communication call," a determination is made as to whether a connection is allowed, depending on a barring state of the cell. Incidentally, when the call type is the "general call," the radio control apparatus (RNC #1), at least, partially prohibits or denies the connection of the mobile station #1.

Here, a determination can be made by some methods, as to whether the call type of the communication of the mobile station #1 is the "important communication call." For example, an information element (which indicates that the call type is the "important communication call") may be newly added to the information element IE "System Information Container Stored Indicator." Alternatively, a determination may be made as to whether the call type is the "important communication call" by a combination of an information element (Establishment Cause), which indicates a cause of transmitting the connection request signal (RRC Connection Request), and the information element IE "System Information Container Stored Indicator." When the call type is the "important communication call," one of processes is executed. Here, the processes are indicated by "case 1" and "case 2" in the figure. When barring performed by the first radio control apparatus (RAT #1) of the second RAT is the access percentage barring, the process of the "case 1" is executed. When barring is other than the access percentage barring (the access prohibition regulation or the barring during construction), the process of the "case 2" is executed.

For case 1, barring is the access percentage barring. Basically, since this barring is for distributing the load, communication of the "general call" is barred, but communication of the "important communication call" is allowed. At step S211, the radio control apparatus (RNC #1) determines that a connection of the "important communication call" of the mobile station #1 is allowed. At step S213, the radio control apparatus (RNC #1) transmits a control signal (RRC Connection Setup), which indicates that the connection is allowed, to the mobile station #1. In response to this, at step S215, the mobile station #1 transmits a control signal (Initial Direct Transfer), which is for establishing the connection, to the radio control apparatus (RNC #1), and thereby the connection of a radio section is established. Further, at step S217, the radio control apparatus (RNC #1) transmits a control signal (RANAP: Initial UE Message), which indicates that the connection of the radio section is established, to the core network. This control signal also includes information indicating that the connection of the "important communication call" of the mobile station #1 is allowed. By reporting that the connection of the "important communication call" is established, the "important communication call" can also be preferentially processed in the core network.

For case 2, barring is the barring during construction or the access prohibition regulation. For the case of this barring, it is difficult to provide a communication service with suitable quality, regardless of the call type. Accordingly, even if the call type is the "important communication call", a determination is made to reject the connection (step S221). At step S223, the radio control apparatus (RNC #1) transmits a control signal (RRC Connection Reject), which indicates that the connection is rejected, to the mobile station #1. When the mobile station #1 can be connected to another switching destination (e.g., the second radio control apparatus (RNC #2) of the second RAT), the mobile station #1 transmits the connection request signal (RRC Connection Request) to the radio control apparatus (RNC #2) at step S225. Information such as a frequency of the other switching destination (RNC #2) may be included in the control signal (RRC Connection Reject) of step S223, which is for rejecting the connection, or in the release redirection control signal of step S203 as a second candidate.

<5. Base Station (eNB)>

Figure 3:
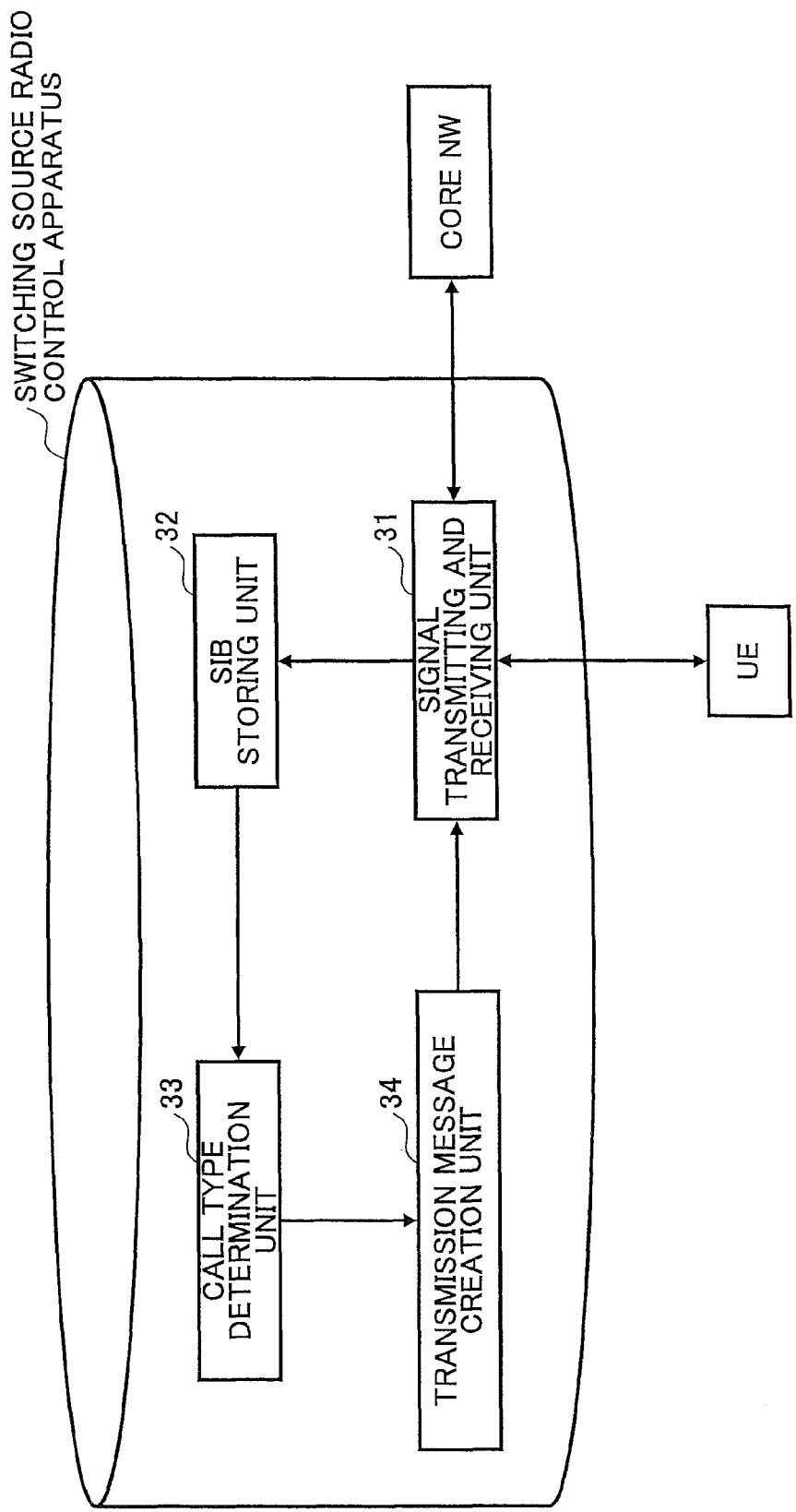
FIG. 3 is a functional block diagram of a switching source radio control apparatus.
Figure 4:
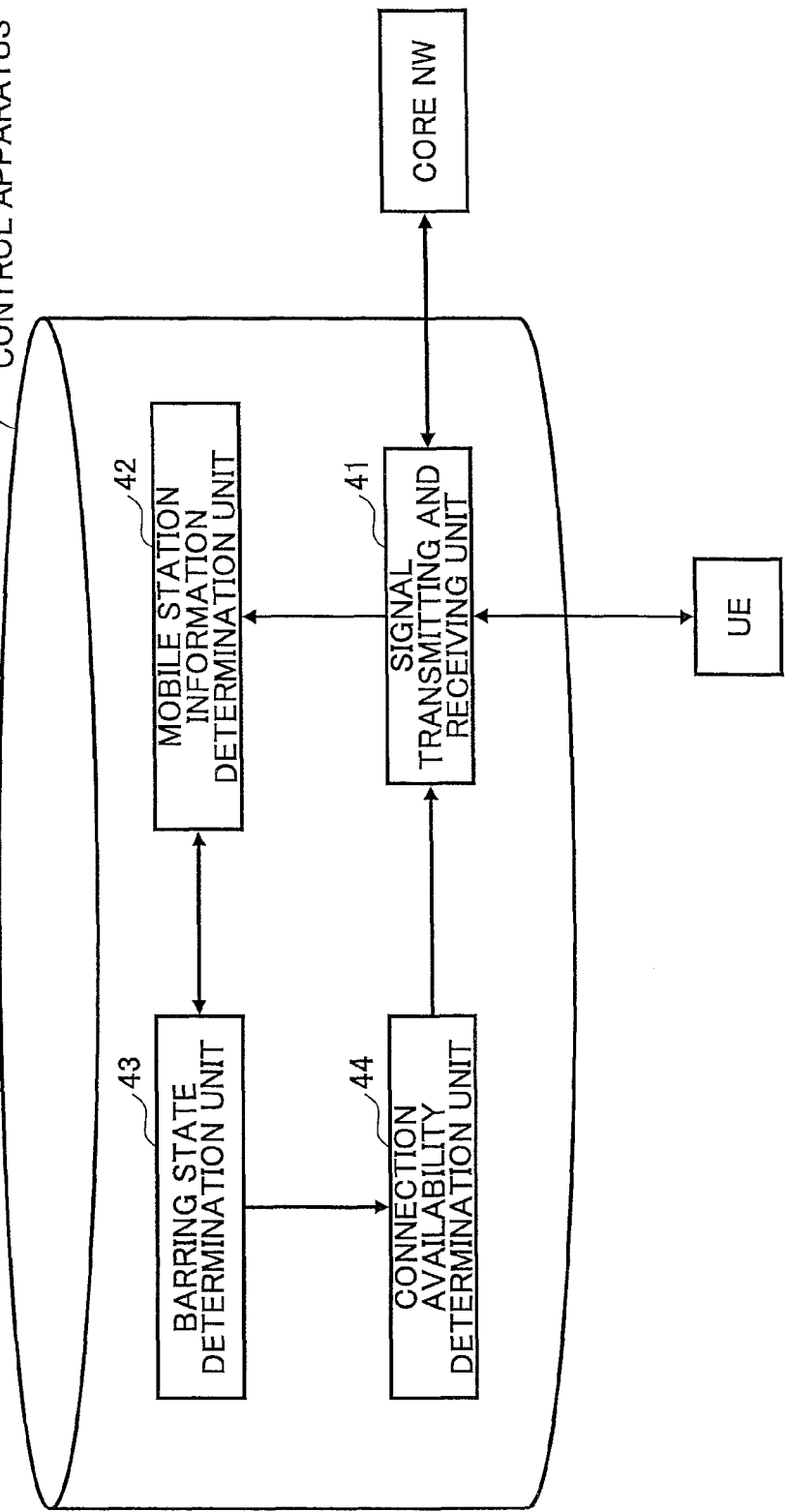
FIG. 4 is a functional block diagram of a switching destination radio control apparatus.

Hereinafter, functional blocks of the radio control apparatus are explained while referring to FIGS. 3 and 4. FIG. 3 shows a functional block diagram of the radio control apparatus (eNB #1) of the first RAT, which is shown in FIG. 1. FIG. 4 shows a functional block diagram of the radio control apparatuses (eNB #1 and eNB #2) of the second RAT, which is shown in FIG. 1. FIG. 3 shows the radio control apparatus, which is the switching source when the mobile station switches the RAT to be connected. FIG. 4 shows the radio control apparatus, which is the switching destination. When the switching is executed from the LTE RAT to the 3G RAT, the base station (eNB #1) includes the processing units which are shown in FIG. 3, and the radio network controllers (RNC #1 and RNC #2) include the processing units which are shown in FIG. 4. Conversely, when the switching is executed from the 3G RAT to the LTE RAT, the base station (eNB #1) includes the processing units which are shown in FIG. 4, and the radio network controllers (RNC #1 and RNC #2) include the processing units which are shown in FIG. 3.

In FIG. 3, functional elements are exemplified, which are particularly related to the embodiment of the present invention, among various functional elements included in the switching source radio control apparatus. The switching source radio control apparatus (eNB #1) includes, at least, a signal transmitting and receiving unit 31; a SIB storing unit 32; a call type determination unit 33; and a transmission message creation unit 34.

The signal transmitting and receiving unit 31 transmits a signal or a message to an external apparatus (e.g., a mobile station or a mobile switching center), and receives a signal or a message from the external apparatus.

The SIB storing unit 32 maintains broadcast information or system information, which is transmitted in the same RAT or a different RAT. The broadcast information or the like is repeatedly received from a neighboring radio control apparatus through the signal transmitting and receiving unit 31, and the broadcast information or the like is updated and maintained. The SIB storing unit 32 determines whether the broadcast information is maintained, the broadcast information which is utilized in the switching destination RAT of the mobile station. When the broadcast information is maintained, the SIB storing unit 32 transmits the broadcast information to the transmission message creation unit 34.

The call type determination unit 33 determines whether a call type of communication, which is performed by the mobile station that switches the RAT, is the "general call" or the "important communication call."

The transmission message creation unit 34 creates a control signal (e.g., the release redirection control signal, or the connection request signal) to be transmitted to the mobile station. The control signal is transmitted from the signal transmitting and receiving unit 31 to the mobile station.

<6. Radio Network Controller (RNC)>

FIG. 4 shows a functional block diagram of the radio control apparatuses (eNB #1 and eNB #2) of the second RAT, which is used in the system shown in FIG. 1. In FIG. 4, functional elements are exemplified, which are particularly related to the embodiment of the present invention, among various functional elements included in the switching destination radio control apparatus. Each of the switching destination radio control apparatuses (RNC #1 and RNC #2) includes, at least, a signal transmitting and receiving unit 41; a mobile station information determination unit 42; a barring state determination unit 43; and a connection availability determination unit 44.

The signal transmitting and receiving unit 41 transmits a signal or a message to an external apparatus (e.g., a mobile station or a mobile switching center), and receives a signal or a message from the external apparatus.

The mobile station information determination unit 43 determines whether a call type of communication, which is requested by the mobile station, is the "important communication call" or the "general call" by confirming an information element which is included in the connection request signal (RRC Connection Request), which is received from the mobile station. In this case, by confirming a setting value of the information element IE "System Information Container Stored Indicator," which is included in the connection request signal, a determination may be made as to whether the call type is the "important communication call."

The barring state determination unit 43 determines a type of barring which is performed in the RAT of the radio control apparatus, and the barring state determination unit 43 transmits a determination result to the connection availability determination unit 44.

The connection availability determination unit 44 determines whether the connection request form the mobile station is allowed, based on the reported determination result. A determination result is transmitted to the mobile station through the signal transmitting and receiving unit 41.

As described above, according to the embodiment of the present invention, the radio control apparatus determines whether the communication of the mobile station is the "important communication call," and the redirection according to the "Release with Redirection with SIB" is performed only if the communication is the "important communication call." However, the broadcast information to be transmitted to the mobile station is modified to indicate that barring is not performed, regardless of the barring state of the switching destination. In this manner, it can be avoided that the mobile stations originating the "important communication call" are uniformly barred in the switching destination, and the effect on the communication service can be avoided. Further, the information is transmitted to the core network of the switching destination, and the "important communication call" is preferentially connected also in the core network, and thereby the effect on the communication service can be avoided. Furthermore, when the switching destination is in a predetermined barring state, the connection is not allowed, even if the communication related to the redirection is the "important communication call." In this manner, the effect on the communication service can be avoided.

Hereinabove, the radio control apparatus, the connection destination switching method, and the system are explained by the embodiment. However, the present invention is not limited to the above-described embodiment, and various modifications and improvements may be made within the scope of the present invention. For example, the present invention may be applied to any suitable mobile communication system in which switching of the RAT is performed by the redirection. For example, the present invention may be applied to a W-CDMA system, a HSDPA/HSUPA based W-CDMA system, an LTE system, an LTE-Advanced system, an IMT-Advanced system, a WiMAX-based system, a Wi-Fi based system, and the like. Specific examples of numerical values are used in order to facilitate understanding of the invention. However, these numerical values are simply illustrative, and any other appropriate values may be used, except as indicated otherwise. The separations of the embodiments or the items are not essential to the present invention. Depending on necessity, subject matter described in two or more items may be combined and used, and subject matter described in an item may be applied to subject matter described in another item (provided that they do not contradict). A boundary of a functional unit or a processing unit in a functional block is not necessarily corresponds to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present application is based on and claims the benefit of priority of Japanese Patent Application No. 2011-268035, filed on Dec. 7, 2011, the entire contents of which are hereby incorporated by reference.

List Of Reference Symbols
31: Signal transmitting and receiving unit
32: SIB storing unit
33: Call type determination unit
34: Transmission message creation unit
41: Signal transmitting and receiving unit
42: Mobile station information determination unit
43: Barring state determination unit
44: Connection availability determination unit
UE: Mobile station
NW: Network

The invention claimed is:

1. A radio control apparatus configured to control radio communication of a communication terminal in a first radio communication system, the radio control apparatus comprising a processor, the processor comprising:
 a determination unit configured to determine a call type of a communication of the communication terminal when a connection destination of the communication terminal is switched to a second radio communication system;
 a storing unit configured to repeatedly receive and store broadcast information, wherein the broadcast information is transmitted in the second radio communication system; and
 a communication unit configured to transmit a release redirection control signal to the communication terminal, wherein the release redirection control signal indicates that a connection with the first radio communication system is to be disconnected, and that a connection with the second radio communication system is to be established;
 wherein, when the call type determined by the determination unit is a general call, the communication unit transmits the release redirection control signal not including the broadcast information to the communication terminal, and
 wherein, when the call type determined by the determination unit is an important communication call, the communication unit transmits the release redirection control signal including the broadcast information to the communication terminal.

2. The radio control apparatus according to claim 1,
wherein, when the call type determined by the determination unit is the important communication call, and when the second radio communication system is barred, the communication unit transmits the release redirection control signal including the broadcast information to the communication terminal, wherein the broadcast information indicates that barring is not performed.

3. A connection destination switching method comprising:
a step of determining a call type of a communication of a communication terminal when a first radio control apparatus switches a connection destination of the communication teiminal to a second radio communication system, wherein the first radio control apparatus is configured to control radio communication of the communication terminal in a first radio communication system; and
a step, by the first radio control apparatus, of transmitting a release redirection control signal to the communication terminal, wherein the release redirection control signal indicates that a connection with the first radio communication system is to be disconnected, and that a communication with the second radio communication system is to be established,
wherein, when the determined call type is a general call, the step of transmitting transmits a release redirection signal not including broadcast information to the communication terminal, wherein the broadcast information is transmitted in the second radio communication system, and
wherein, when the determined call type is an important communication call, the step of transmitting transmits the release redirection signal including the broadcast information to the communication terminal.

4. The connection destination switching method according to claim 3,
wherein, when the determined call type is the important communication call, and when the second radio communication system is barred, the step of transmitting transmits the release redirection control signal including the broadcast information to the communication terminal, wherein the broadcast information indicates that barring is not performed.

5. The connection destination switching method according to claim 3, further comprising:
a step of determining, in the second radio control apparatus, whether a call type of a communication requested by a connection request signal received from the communication terminal is the important communication call, wherein the second radio control apparatus controls the radio communication of the communication terminal in the second radio communication system.

6. The connection destination switching method according to claim 5, further comprising:
a step, by the second radio control apparatus, of reporting that the call type of the communication requested by the connection request signal is the important communication call to a communication node of a core network.

7. The connection destination switching method according to claim 5, further comprising:
a step, by the second radio control apparatus, of determining, when barring is performed in the second radio communication system, whether the communication of the communication terminal is to be barred, depending on whether the call type is the important communication call.

8. A system that includes, at least, a first radio control apparatus configured to control first radio communication of a communication terminal in a first radio communication system; and a second radio control apparatus configured to control second radio communication of the communication terminal in a second radio communication system,
wherein the first radio control apparatus comprises a processor, the processor comprising:
a determination unit configured to determine a call type of a communication of the communication terminal when a connection destination of the communication terminal is switched to the second radio communication system;
a storing unit configured to repeatedly receive and store broadcast information, wherein the broadcast information is transmitted in the second radio communication system; and
a communication unit configured to transmit a release redirection control signal to the communication terminal, wherein the release redirection control signal indicates that a connection with the first radio communication system is to be disconnected, and that a connection with the second radio communication system is to be established,
wherein, when the call type determined by the determination unit is a general call, the communication unit transmits the release redirection signal not including the broadcast information to the communication terminal, and
wherein, when the call type determined by the determination unit is an important communication call, the communication unit transmits the release redirection signal including the broadcast information to the communication terminal.

* * * * *